US008401067B2

(12) United States Patent
Kim et al.

(10) Patent No.: US 8,401,067 B2
(45) Date of Patent: Mar. 19, 2013

(54) METHOD AND APPARATUS FOR MEASURING QOE GUARANTEED REAL-TIME IP-MEDIA VIDEO QUALITY

(75) Inventors: Jin-sul Kim, Daejeon (KR); Hyun-woo Lee, Daejeon (KR); Won Ryu, Daejeon (KR); Byung-sun Lee, Daejeon (KR)

(73) Assignees: Electronics and Telecommunications Research Institute, Daejeon-si (KR); KT Corporation, Seongnam-si (KR)

( * ) Notice: Subject to any disclaimer, the term of this patent is extended or adjusted under 35 U.S.C. 154(b) by 1357 days.

(21) Appl. No.: 12/113,620

(22) Filed: May 1, 2008

(65) Prior Publication Data
US 2009/0154368 A1   Jun. 18, 2009

(30) Foreign Application Priority Data

Dec. 17, 2007   (KR) .................. 10-2007-0132442

(51) Int. Cl.
*G06K 9/46*   (2006.01)

(52) U.S. Cl. ...................................... 375/240; 382/236

(58) Field of Classification Search .................. 375/239, 375/240, 240.01, 240.09, 240.11, 240.13, 375/240.14, 240.15, 240.16, 240.17, 240.19, 375/240.21; 382/228, 232, 236, 239, 240, 382/248, 260, 276; 348/177, 179, 180, 189, 348/192, 208.4, 409.1, 410.1, 411.1, 412.1, 348/415.1
See application file for complete search history.

(56) References Cited

U.S. PATENT DOCUMENTS

| | | | | |
|---|---|---|---|---|
| 6,222,882 B1 * | 4/2001 | Lee et al. | ................. | 375/240.16 |
| 6,246,803 B1 * | 6/2001 | Gauch | ........................... | 382/276 |
| 6,801,573 B2 * | 10/2004 | Zheng | ...................... | 375/240.11 |
| 2003/0021344 A1 * | 1/2003 | Panusopone et al. | ..... | 375/240.16 |
| 2003/0031368 A1 * | 2/2003 | Myler et al. | .................. | 382/228 |
| 2005/0094003 A1 * | 5/2005 | Thorell | ......................... | 348/241 |
| 2005/0285947 A1 * | 12/2005 | Grindstaff et al. | ......... | 348/208.4 |
| 2006/0276983 A1 * | 12/2006 | Okamoto et al. | .............. | 702/69 |
| 2008/0232713 A1 * | 9/2008 | Iizuka | ........................... | 382/281 |

FOREIGN PATENT DOCUMENTS

| | | |
|---|---|---|
| KR | 1020060033717 | 4/2006 |
| KR | 1020060135354 | 12/2006 |
| KR | 1020070088716 | 8/2007 |

* cited by examiner

*Primary Examiner* — Michael Thier
*Assistant Examiner* — Prince A Mensah
(74) *Attorney, Agent, or Firm* — Nelson Mullins Riley & Scarborough LLP; EuiHoon Lee, Esq.

(57) ABSTRACT

A method and apparatus for measuring the quality of a video provided in an IP network based media service is provided. The apparatus for measuring Quality of Experience (QoE) guaranteed real-time Internet Protocol (IP)-media video quality, includes: a receiver receiving a transmission video provided through an IP network service platform and an original video corresponding to the transmission video, and extracting frames of the transmission video and the original video; a detector comparing the frames of the transmission video and the original video in real time to obtain a difference between the frames of the transmission video and the original video and detecting a matching segment between the transmission video and the original video; and a measurement unit calculating a QoE parameter using the frames of the transmission video and the original video which correspond to the matching segment.

11 Claims, 5 Drawing Sheets

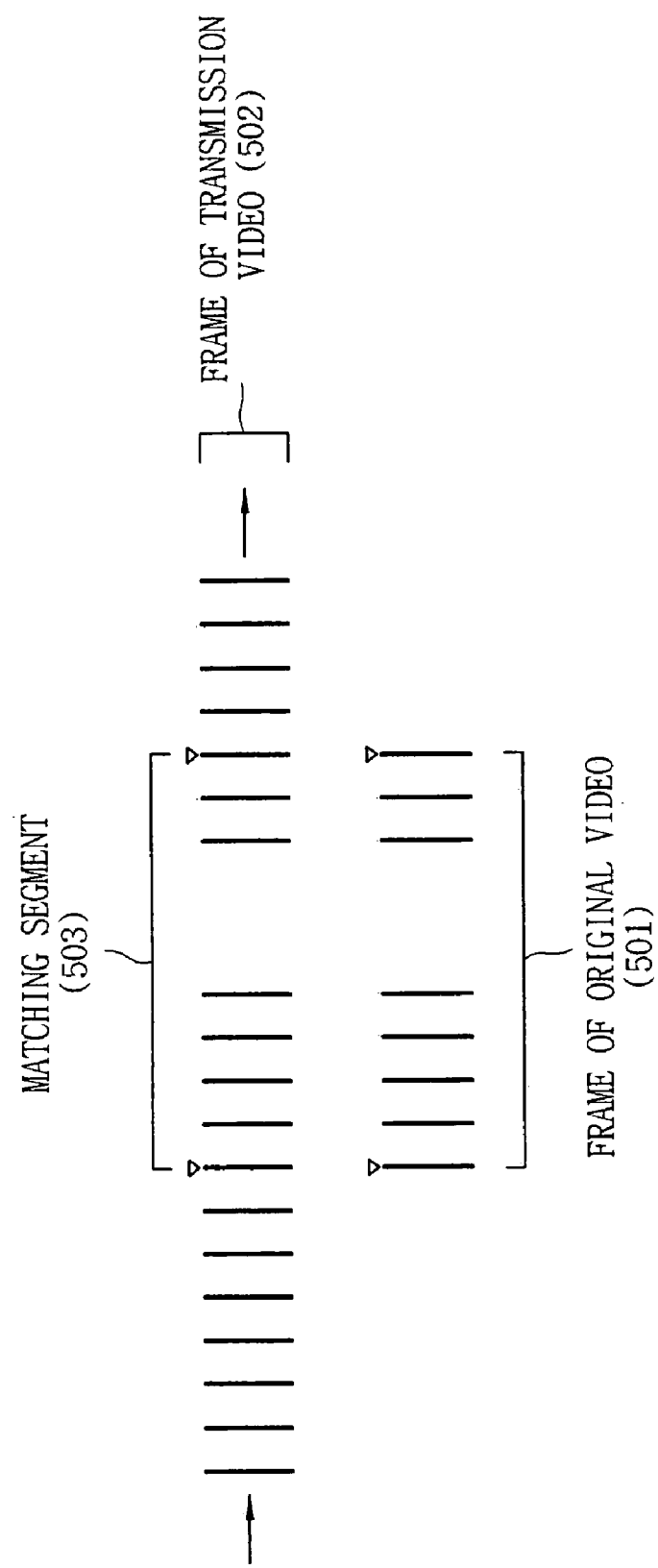

METHOD AND APPARATUS FOR MEASURING QOE GUARANTEED REAL-TIME IP-MEDIA VIDEO QUALITY

CROSS REFERENCE TO RELATED APPLICATIONS

This application claims priority from Korean Patent Application No. 10-2007-0132442, filed on Dec. 17, 2007, the disclosure of which is incorporated herein in its entirety by reference.

BACKGROUND OF THE INVENTION

1. Field of the Invention

The present invention relates to a method and apparatus for measuring Internet Protocol (IP)-media video quality and, more particularly, to a method and apparatus for measuring Quality of Experience (QoE) guaranteed IP-media video quality in real-time broadcasting over an IP network.

2. Description of the Related Art

With the development of information and communication technologies and the growth of the information superhighway, converged communications and broadcasting services have recently been introduced. In the case of a converged network, IP-based multimedia services are increasing more and more. For next-generation converged networks, Korea aims to operate a next generation convergence network (NGcN) or a broadband convergence network (BcN) in an IP-based scheme.

Typical examples of IP media, which are offered over such an IP-based network, include video data broadcast over IPTV or voice data on Internet phones. Such an IP network, however, offers best effort services, thus not guaranteeing Quality of Service (QoS). Therefore, data congestion or traffic trouble due to increasing user numbers causes packet loss or error insertion, resulting in poor services. In particular, a substantial increase in the number of TCP/IP and UDP/IP networks due to a growth of IPTV would lead to a poor IP-based service quality. In this case, it would be necessary to assess a multimedia service quality in order to suspend the service or apply an appropriate charge for the service based on quality.

To assess video quality, an objective measurement method and a subjective measurement method have conventionally been used. The objective measurement method is classified into full reference (FR) measurement, reduced reference (RR) measurement, and no reference (NR) measurement, depending on whether there is an original video available. FR measurement and RR measurement use an original video, thus guaranteeing a reliable measurement, but such measurements are difficult to perform in real time. NR measurement does not use an original video, thus not guaranteeing a reliable measurement. Traditional methods for video matching use undamaged original video and target video and are thus not appropriate for an IP-media environment where damaged videos may cause errors.

SUMMARY OF THE INVENTION

The present invention provides a method and apparatus for measuring and monitoring video quality in real time in an IP network based media service and, more particularly, a method and apparatus for measuring video quality taking into account a Quality of Experience (QoE) factor.

Additional aspects of the invention will be set forth in the description which follows, and in part will be apparent from the description, or may be learned by practice of the invention.

The present invention discloses an apparatus for measuring Quality of Experience (QoE) guaranteed real-time Internet Protocol (IP)-media video quality, including: a receiver receiving a transmission video provided through an IP network service platform and an original video corresponding to the transmission video, and extracting frames of the transmission video and the original video; a detector comparing the frames of the transmission video and the original video in real time to obtain a difference between the frames of the transmission video and the original video and detecting a matching segment between the transmission video and the original video; and a measurement unit calculating a QoE parameter using the frames of the transmission video and the original video which correspond to the matching segment.

The receiver may be connected between elements of the IP network service platform.

The detector may include: a dividing unit dividing the frame of the transmission video and the frame of the original video each into a plurality of blocks; a mapping unit calculating a brightness of each block to create a rank map; a distance calculating unit calculating a distance between the frame of the transmission video and the frame of the original video using the rank map; and a matching segment detecting unit comparing the calculated distance with a predetermined reference distance and, if the calculated distance is shorter than the reference distance, determining a corresponding segment to be a matching segment.

The QoE parameter may include blurring, block distortion, color error, jerkiness, edge busyness or an error block.

The present invention also discloses a method for measuring Quality of Experience (QoE) guaranteed real-time Internet Protocol (IP)-media video quality, including: receiving a transmission video provided through an IP network service platform and an original video corresponding to the transmission video, and extracting frames of the transmission video and the original video; dividing the frame of the transmission video and the frame of the original video each into 8×8 blocks; calculating a brightness of each block to write a rank map; calculating a distance between the frame of the transmission video and the frame of the original video using the rank map; comparing the calculated distance with a predetermined reference distance and, if the calculated distance is shorter than the reference distance, determining a corresponding segment to be a matching segment; and calculating a QoE parameter of a video using the frames of the transmission video and the original video which correspond to the matching segment.

The comparing of the calculated distance with a predetermined reference distance may include, if the calculated distance is equal to or larger than the reference distance, further dividing the frames of the transmission video and the original video each into 16×16 blocks, and further performing the calculating of a brightness of each block to write a rank map and the calculating of a distance between the frame of the transmission video and the frame of the original video using the rank map.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

FIG. 5 illustrates a matching segment according to an exemplary embodiment of the present invention.

DETAILED DESCRIPTION OF EXEMPLARY EMBODIMENTS

Figure 1:
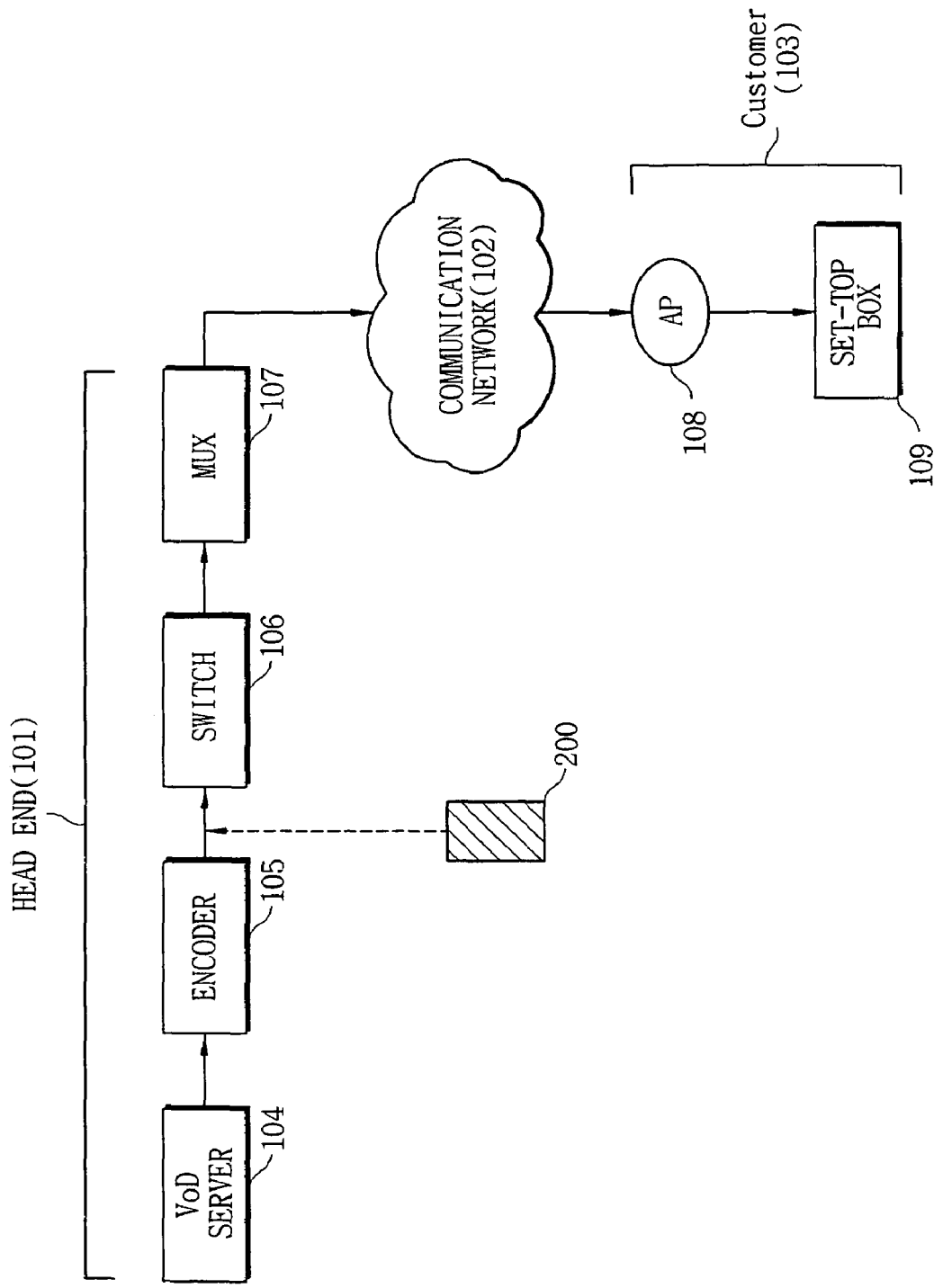
FIG. 1 is a block diagram of an IP network service platform and a video quality measurement device according to an exemplary embodiment of the present invention.

The invention is described more fully hereinafter with reference to the accompanying drawings, in which exemplary embodiments of the invention are shown. This invention may, however, be embodied in many different forms and should not be construed as being limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

FIG. 1 is a block diagram of an IP network service platform and a video quality measurement device according to an exemplary embodiment of the present invention.

The IP network service platform generally includes a head end 101, a communication network 102 and a customer 103. The head end 101 includes a VoD server 104, an encoder 105, a switch 106, and a multiplexer (MUX) 107. The customer 103 includes an access point 108 and a set-top box 109. The video quality measurement device 200 is connected between elements of the IP network service platform. The video quality measurement device 200 takes a sample of a video passing through a connection node and compares it with an original video to measure and monitor the quality of the video.

Although FIG. 1 illustrates the video quality measurement device 200 as being connected between the encoder 105 and the switch 106, the video quality measurement device 200 may be located before or after the communication network 102, or before the set-top box 109.

Figure 2:
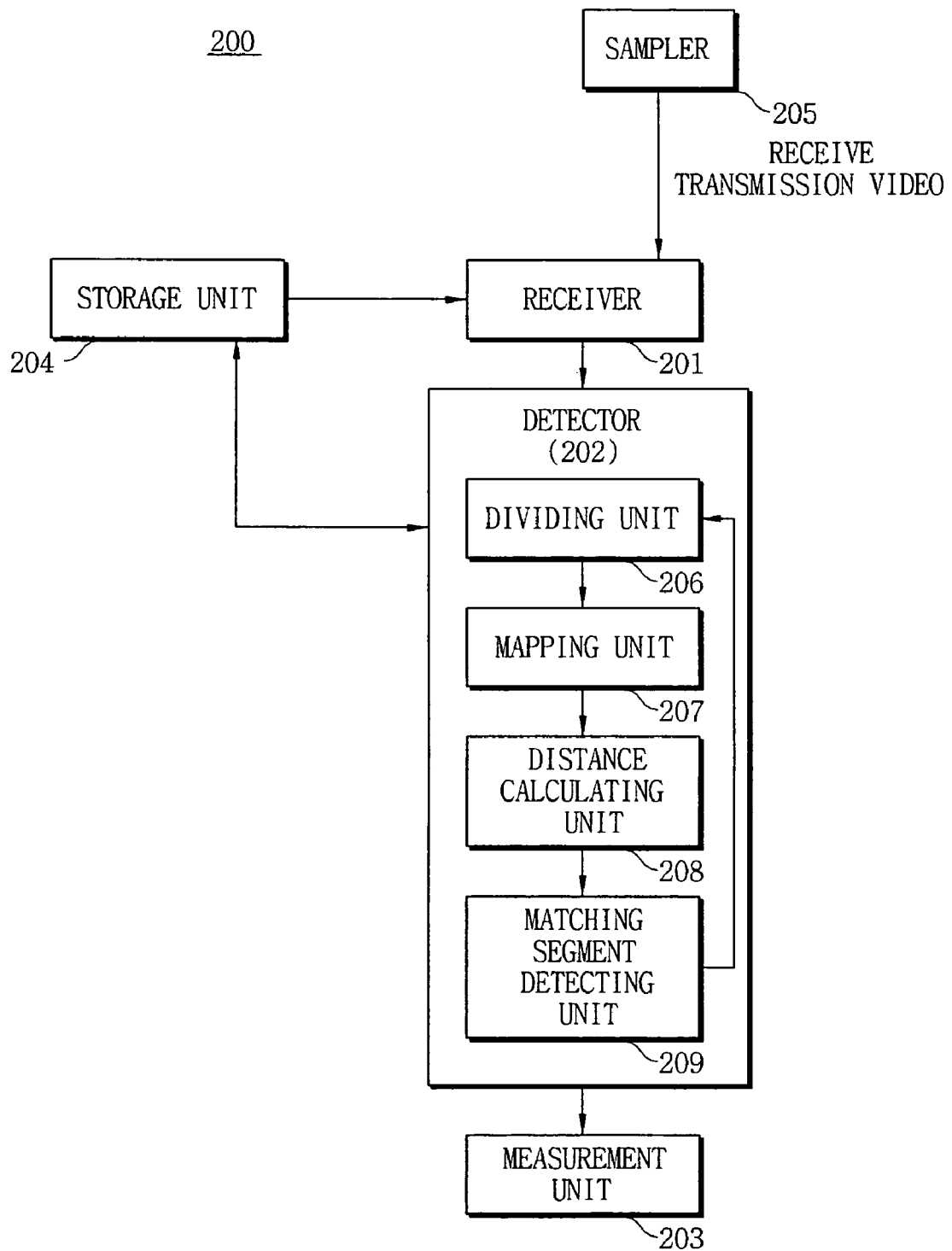
FIG. 2 is a block diagram of a video quality measurement device according to an exemplary embodiment of the present invention.

FIG. 2 is a block diagram of a video quality measurement device according to an exemplary embodiment of the present invention.

The video quality measurement device 200 includes a receiver 201, a detector 202, and a measurement unit 203. The video quality measurement device 200 may further include a storage unit 204 and a sampler 205.

The receiver 201 receives a transmission video and an original video and extracts frames of the videos. The transmission video refers to a TS transmission video which is transmitted through the IP network service platform shown in FIG. 1. For example, when the video quality measurement device 200 is connected between the access point 108 and the set-top box 109 in the IP network service platform, the sampler 205 performs sampling of the transmission video and inputs the sample to the receiver 201. The original video refers to a source video corresponding to the transmission video. The original video may be an image, which is repeatedly broadcast at a predetermined time every day, such as an advertisement picture or a preview picture of a broadcast program. The original video is supplied beforehand through another channel according to an agreement with a service provider and is already stored in the storage unit 204.

The receiver 201 may further include a buffer memory (not shown) to temporarily store frames of the transmission video and the original video.

The detector 202 receives the extracted frames of the transmission video and the original video from the receiver 201, and compares a degree of difference in each frame in real time to detect video frames of the transmission video that match those of the original video. The detector 202 may include a dividing unit 206, a mapping unit 207, a distance calculating unit 208, and a matching segment detecting unit 209. A low-frequency pass filter (not shown) may be provided between the receiver 201 and the detector 202 in order to reduce video noise.

Figure 4:
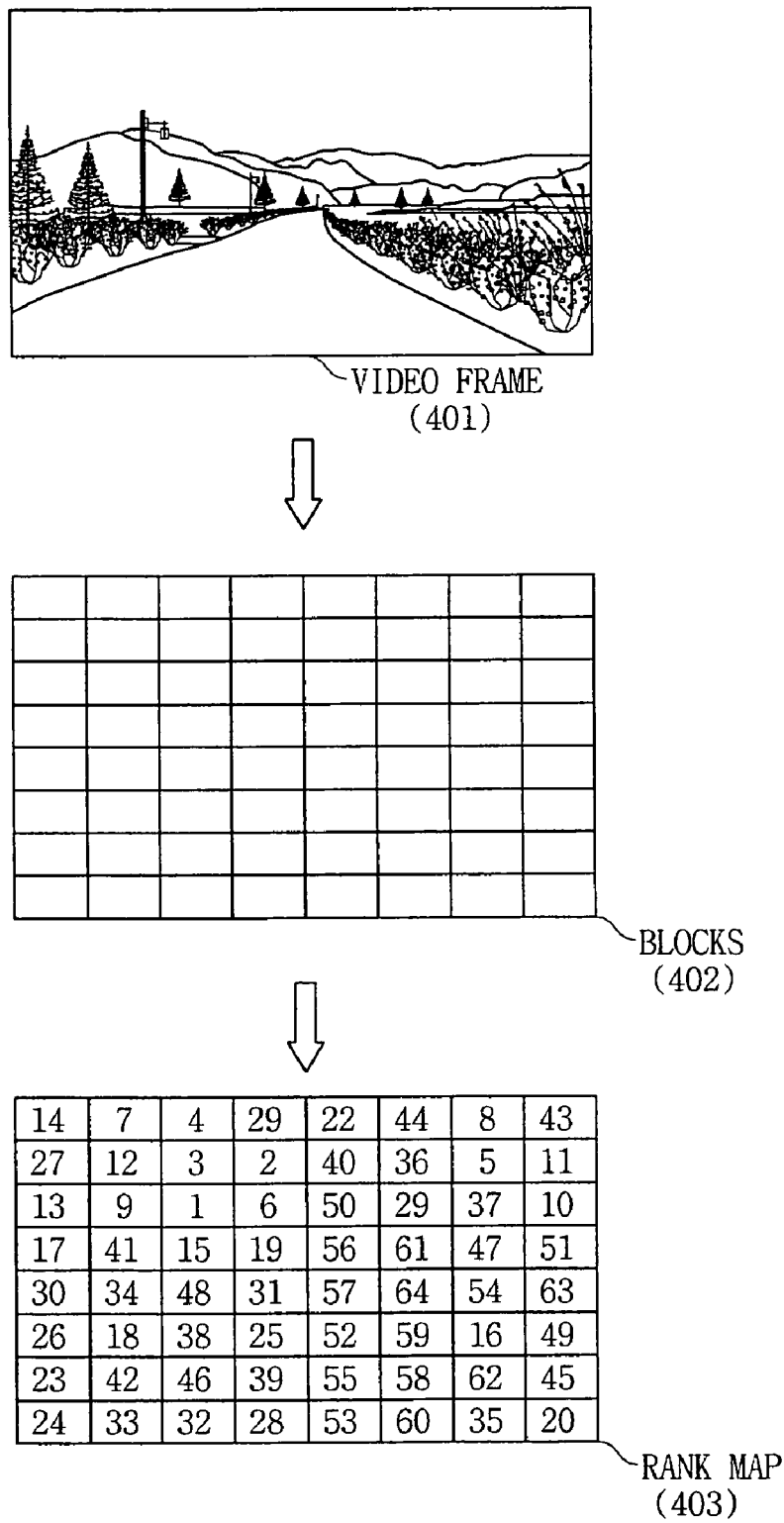
FIG. 4 illustrates a video frame, blocks and a rank map according to an exemplary embodiment of the present invention.

The dividing unit 206 divides each frame of the transmission video and the original video into a plurality of blocks. As shown in FIG. 4, for example, a video frame 401 is divided into 8×8 blocks 402.

The mapping unit 207 calculates brightness of each block to create a rank map. Referring to FIG. 4, the rank map 403 is frame data which indicates brightness or a mean brightness for each block 402.

For example, a rank map for a single frame divided into 64 blocks is expressed by the following Equation 1:

$$M_i = \frac{1}{HW} \sum_{x,y \in B_i} I(x, y), \, i = 1, 2, \ldots, N$$

where $M_i$ indicates a mean brightness of each block; HW, an area of each block; $I(x,y)$, a brightness at $(x,y)$; and N, the number of blocks.

After the mapping unit 207 creates the rank map for each video frame, the distance calculating unit 208 calculates a distance or a degree of difference between each transmission video frame and each original video frame using the rank map. For example, the distance represents a difference between the transmission video and the original video and is expressed by the following Equation 2:

$$d_{n,m} = \frac{1}{N} |TM_i^n - OM_i^{n+m}|, \, i = 1, 2, \ldots N,$$

$$m = 0, 1, \ldots, L - P$$

$$D = \frac{1}{P} \sum_{n=1}^{P} d_{n,m}, \, m = 0, 1, \ldots, L - P$$

where N indicates the number of blocks; $TM_i^n$, a mean brightness of an n-th frame of a transmission video; $OM_i^{n+m}$, a mean brightness of an (n+m)-th frame of an original video; L, a length of a transmission video; and P, a length of an original video.

The matching segment detecting unit 209 compares the calculated distance with a predetermined reference distance. If the calculated distance is shorter than the reference distance, the matching segment detecting unit 209 sets a segment corresponding to the calculated distance as a matching segment between the transmission video frame and the original video frame.

Since a video consists of contiguous frames, if an a-th frame is detected as a matching frame, an (a+b)-th frame is also expected to be detected as a matching frame. This will be described in more detail with reference to FIG. 5.

Referring to FIG. 5, frames 501 of an original video are compared with frames 502 of a transmission video which move one by one from left to right. The distance calculating unit 208 calculates a distance between each frame. The matching segment detecting unit 209 detects frames for which the distance between the frames is shorter than a predetermined reference distance, and stores the frames in a memory, for example, in the storage unit 204. Since the distance refers to a difference between frames, if the distance between the frames is shorter than a predetermined reference distance, a segment 503 of the transmission video matched with that of the original video can be selected.

Referring to FIG. 2, if the calculated distance exceeds the reference distance, the matching segment detecting unit 209 applies a control signal to the dividing unit 206 to divide the frames of the transmission video and original video into more blocks, for example, from 8×8 blocks to 16×16 blocks.

The measurement unit 203 measures a QoE parameter of a video using the frames of the transmission video and original video, which correspond to the detected matching segment. Examples of the QoE parameter include blurring, block distortion, color error, jerkiness, edge busyness and error block.

Accordingly, since a segment of a transmission video matched with that of an original video is extracted and a QoE parameter is measured for a video corresponding to the extracted segment, it is possible to ensure real-time measurement and to make an accurate, quick measurement for guaranteed high-quality IPTV services. Furthermore, since a measurement point can be set for each sector of an IP network service platform, it is possible to immediately determine an error point if an error occurs.

Figure 3:
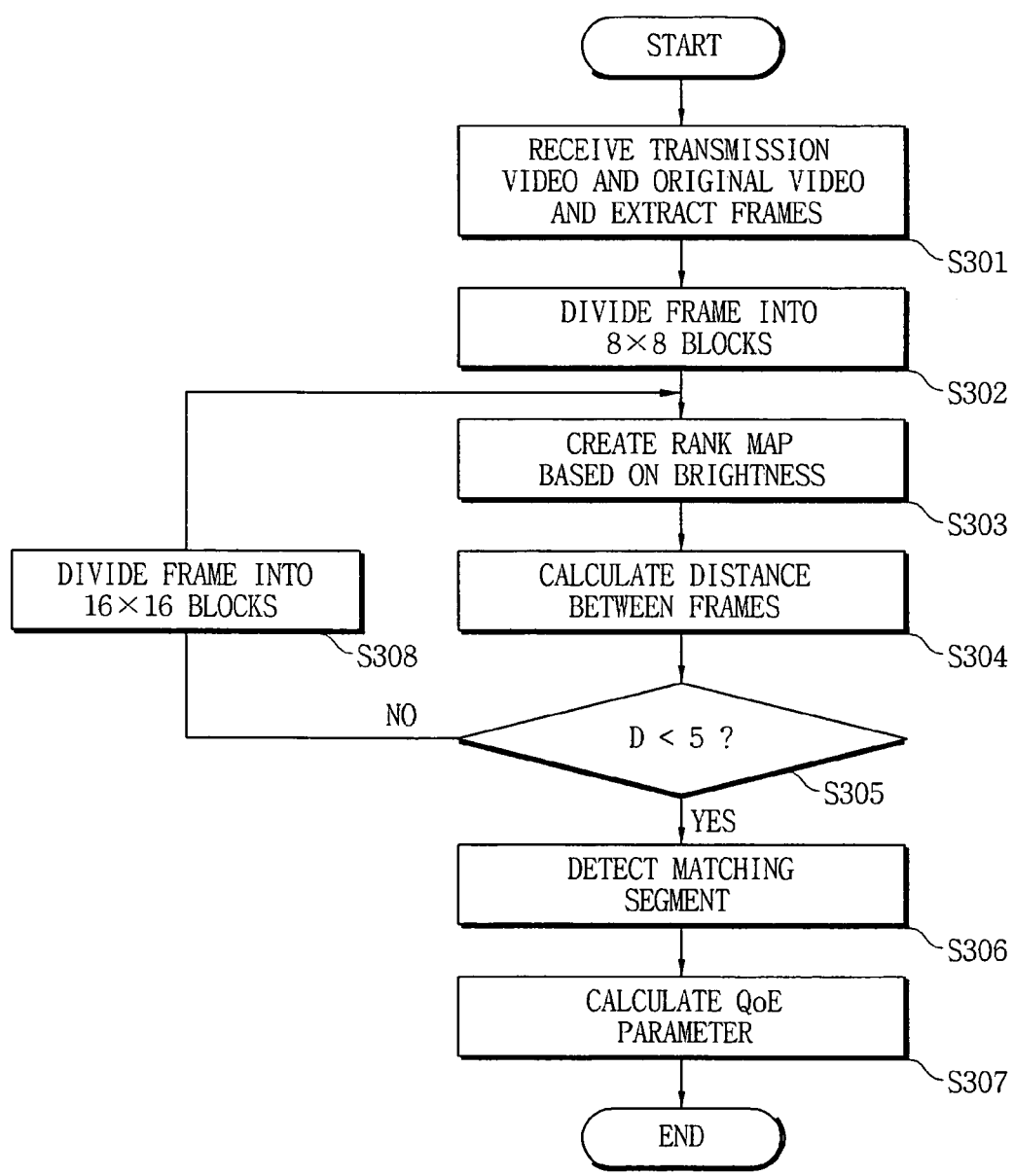
FIG. 3 is a flow chart of a method of measuring video quality according to an exemplary embodiment of the present invention.

FIG. 3 is a flow chart of a method of measuring video quality according to an exemplary embodiment of the present invention.

A transmission video and an original video are received and frames of the transmission video and original video are extracted in operation S301. FIG. 4 illustrates a video frame 401 which is thus extracted.

In operation S301, the transmission video is provided through an IP network service platform, and the original video is sent beforehand through another channel from a service provider and stored. For example, assuming that a transmission video is a "News 9" screen, the original video may be either a "time-signal picture" included in the "News 9" screen, which is assumed to be a picture announcing a standard time and broadcast in the same way every day, or an advertisement picture, which is repeatedly broadcast at a regular time prior to the news.

Once the frames of the transmission video and original video are extracted, each frame is divided into 8×8 blocks in operation S302. Reference number 402 in FIG. 4 denotes the blocks.

Next, a brightness of each block is calculated and used to write a rank map in operation S303. Reference numeral 403 in FIG. 4 denotes the rank map in which each figure indicates a brightness or mean brightness of each block. The brightness of each block is calculated from Equation 1 above.

Once the rank map is created, a distance between a frame of the transmission video and a frame of the original video is calculated using the rank map in operation S304. The distance refers to a difference between each frame and is obtained from Equation 2 above.

Next, the calculated distance is compared with a predetermined reference distance in operation S305. If the calculated distance is shorter than the reference distance, a corresponding segment is detected as a matching segment in operation S306. If the calculated distance is equal to or larger than the reference distance, a corresponding frame is further divided into 16×16 blocks in operation S308, and operations S303 to S305 are repeated. The reference distance has been assumed to be '5' in the present embodiment but is not limited thereto.

Once the matching segment is detected, a QoE parameter is measured with the frame of the transmission video and the frame of the original video, which correspond to the matching segment, in operation S307. A method of measuring the QoE parameter with the two frames is well known in the art and is not described herein.

As apparent from the above description, since a measurement point is set for each sector, such as a head end, a communication network and a customer, and a probe-type measurement device is provided at the measurement point, it is possible to quickly determine an error point if an error occurs.

In addition, since a transmission video transmitted in real time is compared with an original video stored beforehand to extract a matching segment between the transmission video and the original video, it is possible to improve video quality satisfaction.

Furthermore, since a quality measurement method supporting QoE is used, it is possible to efficiently manage and maintain video quality.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. An apparatus for measuring Quality of Experience (QoE) guaranteed real-time Internet Protocol (IP)-media video quality, comprising:
   a receiver receiving a transmission video provided through an IP network service platform and an original video corresponding to the transmission video, and extracting frames of the transmission video and the original video;
   a detector comparing the frames of the transmission video and the original video in real time to obtain a difference between the frames of the transmission video and the original video and detecting a matching segment between the transmission video and the original video; and
   a measurement unit calculating a QoE parameter using the frames of the transmission video and the original video which correspond to the matching segment,
   wherein the detector comprises:
   a dividing unit dividing the frame of the transmission video and the frame of the original video each into a plurality of blocks;
   a mapping unit calculating a brightness of each block to create a rank map;
   a distance calculating unit calculating a distance between the frame of the transmission video and the frame of the original video using the rank map; and
   a matching segment detecting unit comparing the calculated distance with a predetermined reference distance and, if the calculated distance is shorter than the reference distance, determining a corresponding segment to be a matching segment.

2. The apparatus of claim 1, wherein the receiver is connected between elements of the IP network service platform.

3. The apparatus of claim 1, wherein the dividing unit divides the frame of the transmission video and the frame of the original video each into 8×8 blocks.

4. The apparatus of claim 3, wherein if the calculated distance exceeds the reference distance, the matching segment detecting unit controls the dividing unit to further divide the frame of the transmission video and the frame of the original video each into 16×16 blocks.

5. The apparatus of claim 1, wherein the QoE parameter comprises blurring, block distortion, color error, jerkiness, edge busyness or an error block.

6. A method of measuring Quality of Experience (QoE) guaranteed real-time Internet Protocol (IP)-media video quality, comprising:
receiving a transmission video provided through an IP network service platform and an original video corresponding to the transmission video, and extracting frames of the transmission video and the original video;
dividing the frame of the transmission video and the frame of the original video each into 8×8 blocks;
calculating a brightness of each block to write a rank map;
calculating a distance between the frame of the transmission video and the frame of the original video using the rank map;
comparing the calculated distance with a predetermined reference distance and, if the calculated distance is shorter than the reference distance, determining a corresponding segment to be a matching segment; and
calculating a QoE parameter of a video using the frames of the transmission video and the original video which correspond to the matching segment.

7. The method of claim 6, wherein the comparing of the calculated distance with a predetermined reference distance comprises, if the calculated distance is equal to or larger than the reference distance, further dividing the frames of the transmission video and the original video each into 16×16 blocks, and further performing the calculating of a brightness of each block to write a rank map and the calculating of a distance between the frame of the transmission video and the frame of the original video using the rank map.

8. The method of claim 6, wherein the rank map is expressed by the following equation:

$$M_i = \frac{1}{HW} \sum_{x,y \in B_i} I(x, y), \ i = 1, 2, \ldots, N$$

where $M_i$ indicates a mean brightness of each block; HW, an area of each block; I(x,y), a brightness at (x,y); and N, the number of blocks.

9. The method of claim 6, wherein the distance D between the frame of the transmission video and the frame of the original video is expressed by the following equation:

$$d_{n,m} = \frac{1}{N} |TM_i^n - OM_i^{n+m}|, \ i = 1, 2, \ldots N,$$

$$m = 0, 1, \ldots, L - P$$

$$D = \frac{1}{P} \sum_{n=1}^{P} d_{n,m}, \ m = 0, 1, \ldots, L - P$$

where N indicates the number of blocks; $TM_i^n$, a mean brightness of an n-th frame of a transmission video; $OM_n^{n+m}$, a mean brightness of an (n+m)-th frame of an original video; L, a length of a transmission video; and P, a length of an original video.

10. The method of claim 6, wherein the reference distance is set to five (5).

11. The method of claim 6, wherein the QoE parameter comprises blurring, block distortion, color error, jerkiness, edge busyness or an error block.

* * * * *